US011942052B2

(12) United States Patent
Goetz

(10) Patent No.: US 11,942,052 B2
(45) Date of Patent: Mar. 26, 2024

(54) DYNAMIC PIXEL MODULATION

(71) Applicant: Snap Inc., Santa Monica, CA (US)

(72) Inventor: Howard V. Goetz, Tigard, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/791,010

(22) PCT Filed: Jan. 6, 2021

(86) PCT No.: PCT/US2021/012262
§ 371 (c)(1),
(2) Date: Jul. 6, 2022

(87) PCT Pub. No.: WO2021/141953
PCT Pub. Date: Jul. 15, 2021

(65) Prior Publication Data

US 2023/0016573 A1 Jan. 19, 2023

Related U.S. Application Data

(60) Provisional application No. 62/957,684, filed on Jan. 6, 2020.

(51) Int. Cl.
*G09G 3/36* (2006.01)

(52) U.S. Cl.
CPC ....... *G09G 3/36* (2013.01); *G09G 2300/0842* (2013.01); *G09G 2310/0289* (2013.01); *G09G 2310/08* (2013.01); *G09G 2330/028* (2013.01)

(58) Field of Classification Search
CPC .... G09G 3/003; G09G 3/3611; G09G 3/3648; G09G 2320/0693; G09G 3/36;
(Continued)

(56) References Cited

U.S. PATENT DOCUMENTS

2008/0259019 A1* 10/2008 Ng ........................ G09G 3/3648
345/98
2017/0330509 A1* 11/2017 Cok ..................... G09G 3/2014
(Continued)

FOREIGN PATENT DOCUMENTS

CN 115053284 A 9/2022
EP 1091343 A2 4/2001
(Continued)

OTHER PUBLICATIONS

"International Application Serial No. PCT/US2021/012262, International Search Report dated Mar. 24, 2021", 3 pgs.
(Continued)

*Primary Examiner* — Michael A Faragalla
(74) *Attorney, Agent, or Firm* — Schwegman Lundberg & Woessner, P.A.

(57) ABSTRACT

A system for generating a voltage at a pixel array includes a plurality of display pixels forming the pixel array, each display pixel comprising a pixel circuit for driving the pixel. The system further comprises a row formatter configured to store a plurality of bits representing image data for a row of display pixels of the LCOS array; a row controller configured to write a subset of the plurality of bits representing image data for a pixel of the row into a plurality of data latches of said pixel circuit; and a waveform generator for generating reference pulses represented by a set of reference bits. The pixel circuit is configured to compare each reference bit to corresponding bits stored in the latches of each pixel circuit, and generate voltage at an electrode of each pixel based on this comparison.

20 Claims, 17 Drawing Sheets

(58) Field of Classification Search
CPC ... G09G 2300/0491; G09G 2300/0842; G09G 2310/08; G09G 2330/028
See application file for complete search history.

(56) References Cited

U.S. PATENT DOCUMENTS

| | | | | |
|---|---|---|---|---|
| 2019/0327809 | A1* | 10/2019 | Watsuda | H03K 19/20 |
| 2020/0195871 | A1* | 6/2020 | Iizuka | H03M 1/34 |
| 2020/0333662 | A1* | 10/2020 | Hu | G09G 3/2077 |

FOREIGN PATENT DOCUMENTS

| | | | |
|---|---|---|---|
| TW | 202135028 | A | 9/2021 |
| WO | WO-2021141953 | A1 | 7/2021 |

OTHER PUBLICATIONS

"International Application Serial No. PCT/US2021/012262, Written Opinion dated Mar. 24, 2021", 16 pgs.
"Chinese Application Serial No. 202180008216.0, Voluntary Amendment filed Sep. 26, 2022", Claims not amended in response filed, 19 pgs.
"European Application Serial No. 21702553.5, Communication Pursuant to Article 94(3) EPC dated May 3, 2023", 14 pgs.
"International Application Serial No. PCT/US2021/012262, International Preliminary Report on Patentability dated Jul. 21, 2022", 18 pgs.
"Korean Application Serial No. 10-2022-7027158, Office Action dated Aug. 9, 2022", W/O English Translation, 2 pgs.
"Korean Application Serial No. 10-2022-7027158, Notice of Preliminary Rejection dated Jul. 21, 2023", W/ English Translation, 17 pgs.

* cited by examiner

500

500

4x2 Latch Array w/ H and V mirroring

| Gray Level | Wavesteps | Wavestep Delta |
|---|---|---|
| 0 | 0 | 0 |
| 1 | 19 | 19 |
| 2 | 42 | 22 |
| 3 | 65 | 23 |
| 4 | 89 | 24 |
| 5 | 114 | 25 |
| 6 | 139 | 25 |
| 7 | 165 | 26 |
| 8 | 191 | 26 |
| 9 | 218 | 26 |
| ... | ... | ... |
| 252 | 15826 | 137 |
| 253 | 15965 | 138 |
| 254 | 16104 | 139 |
| 255 | 16244 | 140 |

Figure 16

DYNAMIC PIXEL MODULATION

RELATED APPLICATIONS

This application is a U.S. National Stage Filing under 35 U.S.C. 371 from International Application No. PCT/US2021/012262, filed on 6 Jan. 2021, and published as WO 2021/141953 on 15 Jul. 2021, which application claims the benefit of U.S. Provisional Application No. 62/957,684, filed on Jan. 6, 2020. The entire content of which are incorporated herein by reference.

TECHNICAL FIELD

The present disclosure relates to a system for modulating the polarization and phase of light reflected from displays, for example, digital displays and microdisplays, such as Liquid Crystal on Silicon (LCOS) display devices and microLED display devices More particularly, the disclosure relates to systems and methods for providing and operating digital microdisplay systems.

BACKGROUND

LCOS displays typically come in two types characterized primarily by the type of circuitry under each display pixel, namely, analog and digital. These conventional display types are described below one at a time and also in connection with prior art.

Analog Pixel Circuitry

In an analog display, the circuitry under each pixel is primarily just a storage capacitor. In operation, a source of analog voltage is sequentially connected to the storage capacitor in each pixel so as to store an analog voltage in the capacitor in each pixel. These stored voltages are connected to the pixel electrodes for the corresponding pixels. The variable voltages on these pixel electrodes in turn determine the response of the Liquid Crystal (LC) directly above each of these pixels. As a result, they ultimately determine (for Amplitude Displays) the amount of polarization change for light reflected from that pixel, or (for Phase Displays) the amount of phase shift applied to the light reflected from that pixel. This variable voltage is an analog quantity, so the resulting modulation of polarization or phase-shift in the LC also varies as a variable analog quantity. This makes the reproduction of gray-scale images straight-forward for such a display. Analog displays have become more and more difficult to build as the pixel size gets smaller, because very small pixels imply very small pixel capacitors, and these small capacitors cannot hold an accurate charge long enough for successful display operation, due to leakage currents bleeding it off.

Analog pixel circuitry may also include a single pixel capacitor and a transistor, which can be used to connect it to an internal analog data source. In use, each pixel is connected to the internal data source long enough to charge the capacitor to the voltage on the data source. Then the transistor switches off and charging of another pixel begins. This action must be repeated for each pixel in the display during each frame.

There are two limitations of this approach. First, once the capacitor is charged to the desired voltage it must retain this voltage for the rest of the frame. There is always some leakage from such capacitors, both through the insulation in and around the capacitor and through the charge control transistor. For large capacitors with substantial stored charge, this leakage can cause the voltage to change very slowly and so the voltage change could be neglected. However, for capacitors small enough to fit under small pixels, even a small amount of leakage will cause the voltage on the capacitor to discharge rapidly. This change of voltage or discharge during the frame is called "droop", and results in voltage errors over time during the frame. These voltage errors directly translate to amplitude or phase errors. For capacitors small enough to fit in small pixels, it is difficult to prevent this leakage-caused droop from completely discharging the pixel capacitors during the frame. Note that leakage in an IC tends to go up exponentially as die temperature increases, making a difficult problem even worse. Thus, analog circuitry is poorly-suited for very small microdisplays.

The second limitation of this approach is that it takes time to charge each pixel capacitor to its correct value. Since this is basically a serial process (one at a time), it takes a relatively long time to charge all the capacitors for the entire array—typically the entire frame time. This imposes a number of other limitations on the display performance. In particular, it prevents use of other techniques such as Vcom switching or illumination gating which would otherwise be required to make such a display work well, because there is no point in time suitable for these things to happen. To help reduce this charge time, analog designs commonly use multiple analog data sources so that multiple pixels can be charged at the same time, and it is common to encounter designs that use up to 12 data sources running in parallel. Even so, writing a high-resolution display with 2 million or more pixels in a frame time is challenging. The fact that display data is being written over the entire frame time creates limitations.

Digital Displays and Pixel Circuitry

Digital LCOS displays are a newer development. They incorporate digital memory internal to each pixel, which can store only a "1" or "0" state. This means that the pixel electrode can only be set to two possible voltages, corresponding to LC-states that are fully "on" or fully "off". On the other hand, this 1 or 0 state can be written to the pixel very quickly, and doesn't "bleed-off" due to leakage.

Digital LCOS displays typically achieve gray-scale by writing a fast series of 1's and 0's to each pixel, which cause the LC to alternate between these fully-on and fully-off states. These changes happen much faster than the eye can respond to, so the eye averages the duty-cycle for these "off" and "on" conditions into an equivalent gray-scale. In use, digital LCOS displays are typically written with "bit-planes" of 1's and 0's many times during each frame to achieve the required equivalent gray-scale values, using some variant of either Duty-Cycle Modulation (DCM) or Pulse-Width Modulation (PWM) encoding. Digital pixel designs can be made very small (3 μm pitch or less) and do not suffer from leakage problems. However, they tend to require more complex pixel circuits with many more transistors. In addition, they also require very high external data rates to write the large number of bit-planes per frame. Also, the averaging via the human eye's response does not work for Phase-mode displays because voltage errors at the pixel correspond to positional errors in the pixel's apparent position, which the eye does not average. As a result, using digital LCOS displays for phase-mode displays has not previously been very successful.

Existing digital pixel displays operate as "bit-plane devices". This means that the array control logic must write a "1" or "0" value to each pixel data latch in the entire array (a 1 or 0 for every pixel in the display is referred to as a "bit-plane") for any write operation. This operation of writing a bit-plane (writing data to every pixel in the display) typically takes 100 μs or more. This time per bit-plane limitation places constraints on the algorithm for fooling the eye into thinking it is seeing gray scale by sending a sequence of on and off pulses of varying duty cycle. In particular, it means that the shortest voltage pulse that can be present on the pixel electrode is equal to this bit-plane time. This can make high bit-depths difficult, because this bit-plane time is effectively the Least Significant Bit (LSB) time. For example, in an 8-bit system the Most Significant Bit (MSB) is 127 times longer than the LSB time, and it takes 256 LSB-times to display all possible gray values. For example, 256 times 100 μs is 25.6 ms, which is longer than a 60 HZ frame. There is also a problem in that this bit-plane time of ~100 us is close to the minimum LC response time of a few hundred μs.

As a result, the response speed of the LC to any one of these pulses depends on what pulses came immediately before. This creates a non-linear dependence on that pixel's pulse history that is difficult to correct for. Consequently, most digital pixel displays use Pulse-Width Modulation (PWM) techniques. In these techniques, there is a single pulse which varies in width from 0 (for off pixels) to on for the full frame time (for fully on pixels). PWM designs are inherently monotonic, however, they require a large number of bit-planes during the frame. For example, a PWM algorithm for 8-bit gray-scale requires 256 bit planes per color during the frame. And, most of these bit-planes are sending redundant data. In other words, most of the time these bit-planes are writing 0 to pixels that are already off, or writing 1 to pixels that are already on. Supporting this is inherently wasteful of power because it requires huge amounts of write activity during the frame. For example, one current HD display requires greater than 40 Gb/s of input data per color to keep it operating. Transporting this much data from one chip to another is also decidedly non-trivial, requiring elaborate wide-bandwidth data links. Such displays struggle to give good performance at higher bit-depths.

A second problem is that PWM implemented like this cannot be used for phase modulation, because the single pulse consisting of a relatively-long on-period followed by a relatively-long off-period would result in the LC alternating between two radically different phase values. At best, this would yield a distorted image. For phase modulation, alternating 1 bit-planes and 0 bit-planes are sent such that the liquid crystal is constantly kept part-way between on and off. The duty-cycle between these on and off bit-planes determines the "degree of on-ness" of the LC and thus the amount of phase-shift. As before, the bit-plane update time determines the shortest amount of time that the LC spends with constant voltage, and thus by how much the LC-state undershoots or overshoots the desired value. This constant under and over-shoot results in "phase ripple" which causes undesirable image fuzziness and lack of contrast.

Embodiments of the present disclosure ameliorate these problems by providing a pixel array architecture and a pixel circuit which achieves the advantage of an analog pixel design (effectively continuously-variable pixel voltage) by using digital circuitry, and aims to avoid the disadvantages of both existing analog and existing digital designs for microdisplay applications. Such embodiments are suitable for various display applications including microdisplays. Among others, one important problem solved by the embodiments herein is the achievement of a design pixel circuitry which is simple enough (has a small enough number of transistors) to fit under each pixel in the display, while still achieving the functionality required for small pixel display applications. Here, "small pixel displays" refer to pixel arrays with a pixel pitch of 4 micrometers (μm) or less.

BRIEF SUMMARY OF THE DISCLOSURE

According to a first embodiment of the present disclosure, there is provided a system for generating a voltage supplied to a pixel array, for example, a liquid crystal display (e.g., an Liquid Crystal on Silicon (LCOS) display or array of pixels) or an LED display (e.g., a microLED display), said system comprising: a plurality of display pixels forming the pixel array, each display pixel comprising a pixel circuit for driving the pixel; a row formatter configured to store a plurality of bits representing image data for a row of display pixels of the pixel array (such as in memory or the like); a row controller configured to write a subset of the plurality of bits representing image data for a pixel of the row into a plurality of data latches of said pixel circuit; a waveform generator for generating a reference pulse represented by a set of reference bits and wherein the number of reference bits is equal to or corresponds to the number of bits stored in the latches of each pixel circuit; and wherein the pixel circuit is configured to compare each reference bit to corresponding bits stored in the latches of each pixel circuit, and to generate a voltage at an electrode of each pixel based on this comparison.

The voltage supplied to the pixel electrodes modulates a polarization, reflectivity, amplitude and/or phase of light reflected from the display pixels.

In an embodiment, the present disclosure may modulate each pixel independently and locally, and thus does not use bit-planes. In a Dynamic Pixel Modulation (hereinafter "DPM") display according to an embodiment of the present disclosure, the image data may be stored directly in the display pixels (e.g., via the pixel circuitry), and each display pixel may contain circuitry to use this stored data values to control a voltage waveform on its pixel electrode (for example, a reflective device such as a mirror when the display is an LCOS display, and an LED or microLED (or electrode coupled thereto) when the display is a microLED display that is a binary-weighted representation of this stored value, corresponding to the desired gray-scale or phase value. This waveform at each pixel electrode may be a much higher frequency than can be achieved by any bit-plane display. It may be at least an order of magnitude faster than the LC can respond to, so the LC reacts to the RMS value of this waveform instead. The resulting phase ripple may also be at least an order of magnitude smaller and in some or most cases may be negligible.

Additionally, the pixel data may be stored in SRAM latches in each pixel. This is digital storage, and is fully static. This means that there is no droop, and the data remains unchanged until it is re-written, and so the resulting amplitude or phase shift also does not change. Also, digital data can be written into SRAM latches very rapidly, so the entire array can be written in a tiny fraction of the frame time—typically less than 100 μs. Thus, embodiments of the present disclosure does not suffer from the limitations of existing analog microdisplays.

The process of writing the image data to the pixel array may only happen once at the beginning of the imaging process. Thereafter, each pixel takes care of the process of converting this image data to an appropriate pixel electrode voltage waveform.

An embodiment of the present disclosure enables efficient handling of data and allows management of each pixel's amplitude and/or phase modulation based on the loaded values. An embodiment of the present disclosure provides a system and method for handling this conversion, and such system and method are both highly flexible and extremely efficient. This is enabled by the actual circuitry under each pixel which may consist of a digital logic circuit or network (e.g., an AND/OR circuit or network) connected to multiple digital latch circuits, for example 9 latch circuits, that achieves a complex logical function with a minimum number of transistors, such that the transistors can be fit in the available die area under a small pixel, for example a 3 μm×3 μm pixel. Finally, embodiments of the present disclosure provide a fully integrated high-bit-depth, low-phase-ripple digital phase display which does not require an external driver chip.

In an embodiment, the number of bits stored in the latches of each pixel circuit may be 4 to 10 bits. It should be understood by one of ordinary skill in the art that number of bits may vary. The storage of 8-bits of pixel data directly in circuitry under such small pixels (<4 μm) is enabled, and made possible by working at a geometry node (28 nm or 22 nm) not previously used for LCOS microdisplays. It should be understood by one of ordinary skill in the art that number of bits stored in the latch may vary. The number of bits stored in the pixel may be sufficient to define a gray scale value for an entire color sub-frame.

In one embodiment, the waveform generator may be connected to each pixel via a Global Modulation Bus (G-bus). A width of the G-bus may be equal to the number of bits stored in the latches of each pixel circuit. The waveform generator may be configured to send out a word (e.g., 16-bits) of memory contents on the G-bus periodically in sequence to generate a plurality of voltage pulses equal to the width of the G-bus on different G-bus lines.

In another embodiment, a voltage pulse on a G-bus line may be divided across several G-bus lines. This flexibility is an important advantage of embodiments of the present disclosure and allow the exact behavior of the DPM modulation to be almost infinitely altered or adjusted.

The duration of each voltage pulse on the G-bus line may also be programmable via commands written to the display from software on the host or source, and the duration of the voltage pulses may be substantially shorter than a response time of the Liquid Crystal (LC) in the array. In one embodiment, the longest voltage pulses applied to the pixel electrode may be significantly less in duration than the LC response time. It can be appreciated that the software on the host or source may be provided as a computer program, which when run on a computer, causes the computer to configure any apparatus, including a circuit, controller, sensor, filter, or device disclosed herein or perform the commands disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program. The computer program may be provided on a computer readable medium, which may be a physical computer readable medium, such as a disc or a memory device.

The relatively short duration of the voltage pulses means that the all the bits stored in the latches of the pixel circuit may be compared to their corresponding bits stored in the waveform generator within a time period shorter than the LC response time. This comparison can be repeated many times during a display frame or during a sub-frame.

In one embodiment, the output latch is input with bit "1" if the corresponding bit from the logic function output is equal to "1", otherwise the output latch is input with bit "0", when a Gset output from the waveform generator is applied to the output latch. The start or onset of the Gset output is coincident with the start of each voltage pulse on a G-bus line. The output of the output latch is inputted into a level shifter.

The output of the level shifter is a voltage level with a higher voltage when the output of the circuit is bit "1", and a lower voltage if the output of the circuit is bit "0", wherein the voltage produced by the level shifter is applied to the electrode each pixel in the pixel array.

Thus, the overall operating mode has a via very high frequency duty-cycle voltage modulation of the pixel electrode local to each pixel. Since all these on/off events at the pixel electrode can happen much faster than the LC can respond, the LC responds to the Root Mean Square (RMS) voltage equivalent to the entire sequence of pulses if such sequence is executed sufficiently fast.

In one embodiment, there may be no temporal overlap between the voltage pulse on different G-bus lines. This allows modulation by virtue of comparing the individual bits of the pixel data in each pixel to the G-bus (containing the same number of bits) in a 1-bit at a time manner. This has a significant advantage in that modifying the waveform on the G-bus allows one to completely change the modulation algorithm.

In one embodiment, the system may further comprise a display loader configured to write a value for the plurality of bits representing image data for a row of display pixels into the row formatter and/or configured to write a value for the subset of the plurality of bits representing image data for a pixel of the row into the plurality of data latches of each pixel circuit.

In a system in accordance with embodiments of the present disclosure, the plurality of bits representing image data for a row of display pixels may be loaded from a cache system or other storage system (e.g., a storage system including memory devices).

In another embodiment, the duration of each voltage pulse maybe equal to a number of wave-steps clock periods corresponding to a wave-step value stored a waveform delta memory. Each wave-step value stored in the waveform delta memory may represent a different desired gray-scale value. This enables the display to have a programmable response.

BRIEF DESCRIPTION OF THE DRAWINGS

The present disclosure is illustrated and described herein with reference to the various drawings, in which like reference numbers are used to denote like system components, as appropriate, and in which:

FIG. 16 is an illustration of the contents of the waveform generator memory for the waveform generator of FIG. 14.

DETAILED DESCRIPTION

Figure 1:
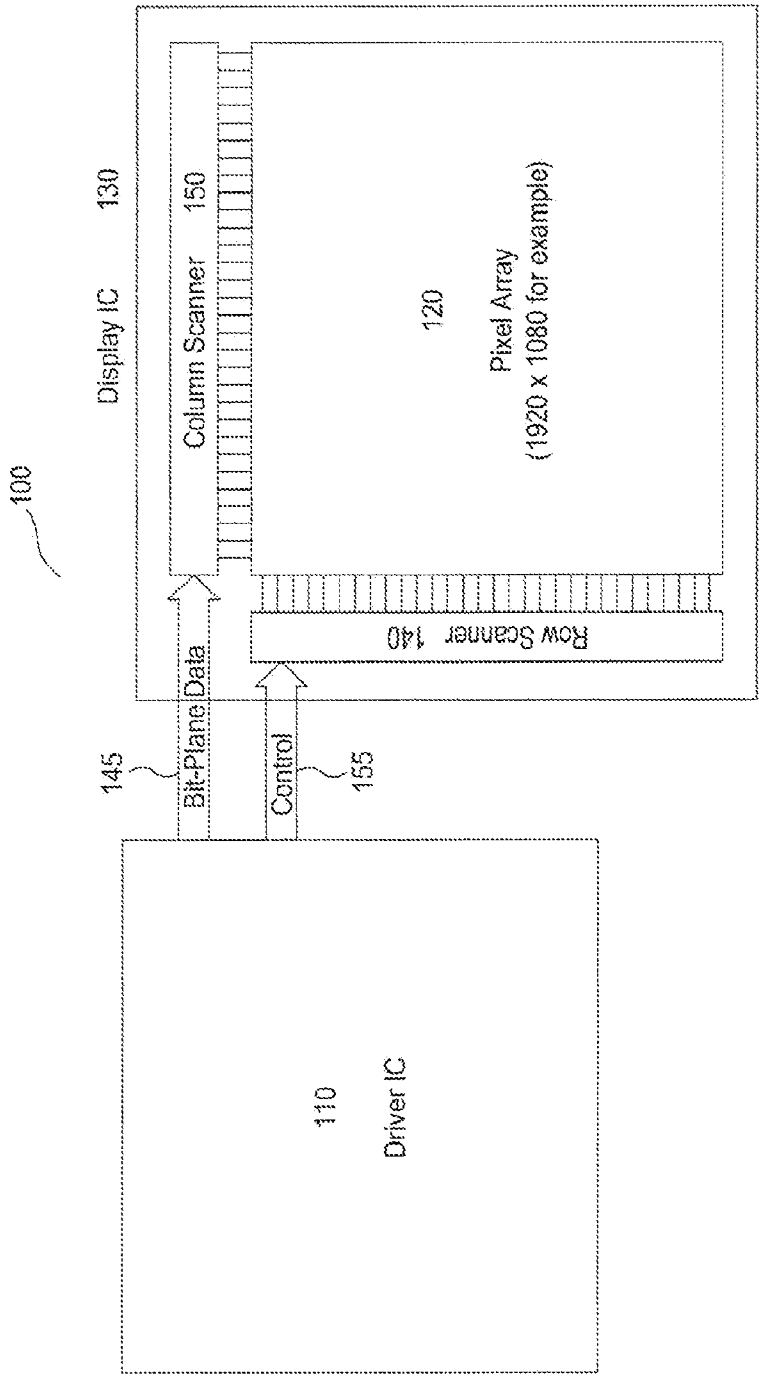
FIG. 1 is a prior-art display system.

FIG. 1 illustrates a simplified block diagram of a typical conventional display system 100. Such known displays rely on a controller (usually in a separate driver IC) 110 to write "Bit-Planes" to the pixel array 120, located within a display circuit 130. The display circuit 130 also includes a column scanner 140, which stores and provides bit-plane data 145 for the pixel array 120, and a row scanner 150, which provides control signals 155 to enable the data 145 to be written into array 120. Each bit-plane write will write either a "1" or "0" to every pixel in the display 120. Any time it is desirable to change the state of any pixel, at any possible gray-code, it is necessary to write an entire new bit-plane to the array 120. This has several disadvantages.

Firstly, writing a bit-plane takes significant time. For example, HD displays with >2 million pixels typically take between 50 μs and 100 μs to write a bit-plane. This time places a lower limit on how frequently a pixel can change state, and therefore determines the shortest pulse that can appear on a pixel electrode. Secondly, such displays 100 are very inefficient in terms of the array write activity. Most of the time these bit-plane writes will write "1" to pixel memory (e.g., Static Random-Access Memory or SRAM) that are already in the 1-state, and write "0" to SRAMs that are already in the 0-state. These redundant writes do not serve any useful purpose and are wasteful of power. Furthermore, they are inherent in the nature of a bit-plane display 100 and cannot be eliminated without adding a lot of additional complexity to the pixel 120 and array drive circuitry.

Thirdly, it takes a lot of data bandwidth to feed all this bit-plane data 145 to the display 100, much of which is effectively wasted due to the redundancy noted above. For example, to send a continuous sequence of bit-planes to a 1920×1080 HD display (using 100 μs bit-plane time) takes in excess of 20 Gb/s. Supporting this kind of data flow to a display requires extreme interface technology (wide parallel buses or multiple SERDES links) with the attendant high power consumption these imply. It also places demands on the driver IC 110 that are difficult to support and consumes large amounts of power in that chip as well.

Figure 2:
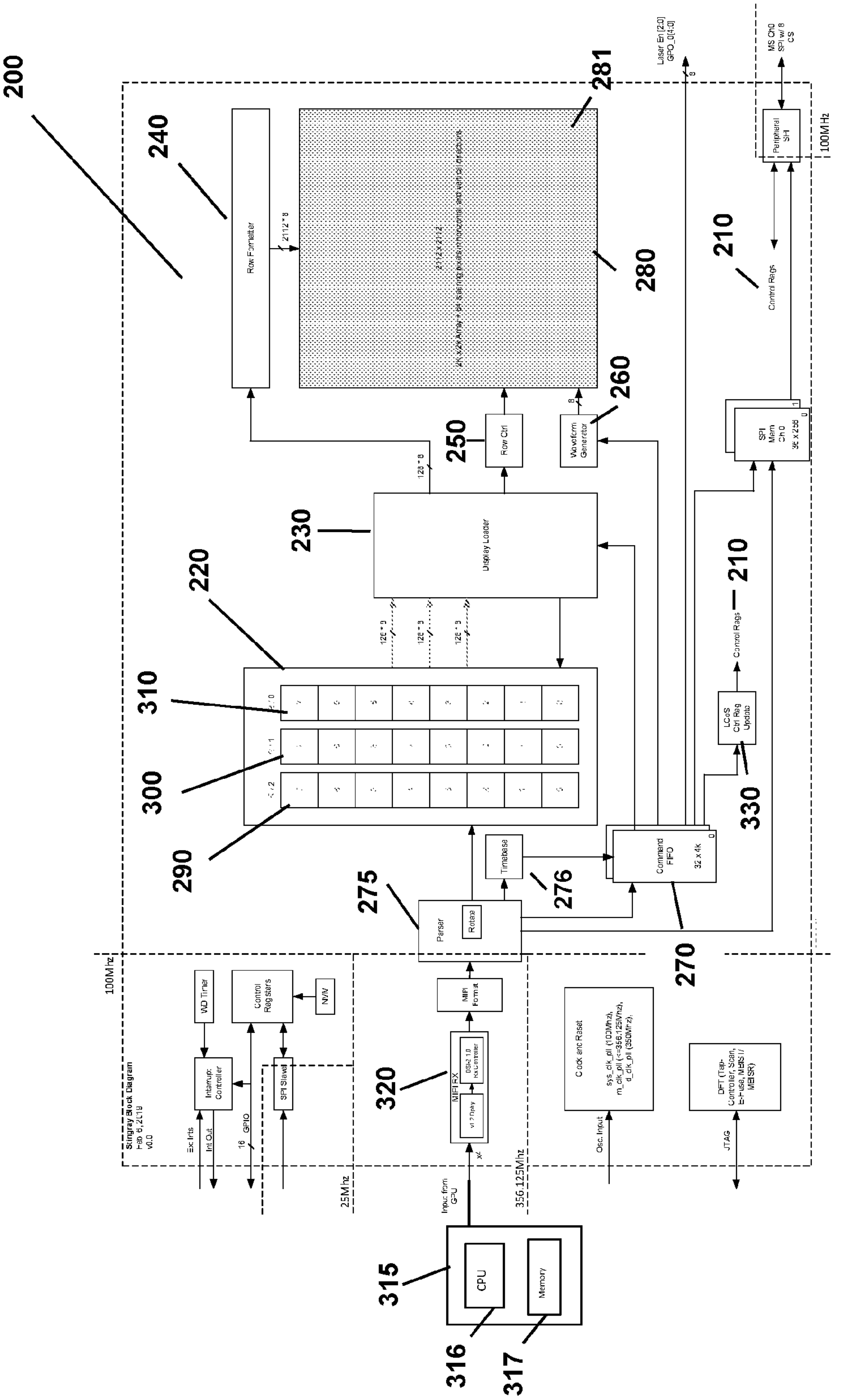
FIG. 2 is a diagram of the DPM—a 2112×2112 pixel display according to an embodiment of the present disclosure.

FIG. 2 illustrates a block diagram of a LCoS display device 200 according to an embodiment of the present disclosure. FIG. 2 includes, but is not limited to, the following components: Control Registers 210; Cache System 220; Display Loader 230; Row Formatter 240; Row Control (Ctrl) 250; Waveform Generator 260; Command FIFO file 270; and 2 k×2 k pixel array 280 (gray block on the right). Other parts of the diagram may vary from one embodiment to another without substantially affecting the basics of embodiments of the present disclosure.

In FIG. 2 is a storage system 220, for example, a cache system or storage system. In an embodiment of the present disclosure, the storage system includes storage devices, such as memory devices. The cache or storage system 220 contains working copies of image data, an image or images organized as three (3) color caches for Red 290, Green 300, and Blue 310 data each of 8-bits depth. The image date includes a plurality of bits. It should be understood by one of ordinary skill in the art that the colors may vary. If the display is to be operated as a monochrome display, only one of these will actually be used. The data in these caches 220 is written-in during the previous frame, using whatever image interface is appropriate for the particular display.

Before actual display operation can begin, an external control device 315 (CPU 316 or other data source or host) must write 330 values to the "Control Registers" 210 to control the operation of the display. The control values may be stored in memory 317 on the external device 315. These control values may contain some or all of the following: image size in X, Y pixels; image offset (if any) from left/top edges; image flip (if desired) in Horizontal and/or Vertical; row-strobe setup and hold timing adjustments; timing resolution of the Waveform Generator 260; number of Waveform Generator pulses per sub-frame; and other mode-control settings. It is also necessary for the external control device 315 to fill up the Command FIFO 270 with a series of internal commands. Some of these commands define the exact waveform and timing for the Waveform Generator 260. For example, the duration of each voltage pulse on the G-bus line may also be programmable via commands written to the display from software on the host or source. In one embodiment, there may be no temporal overlap between the voltage pulses on different G-bus lines. Turning to the flow-chart 400 provided in FIG. 3, once the control registers have been written, the display 280 waits for a "Start of Frame" event at step 410. Generally, this will be decoded by a communications interface, for example, a MIPI interface. For a Color Sequential device such as shown in FIG. 2, there will actually be 3 or more color sub-frames. In this case, the flow-chart shown in FIG. 3 applies to each of these color sub-frames.

Figure 4:
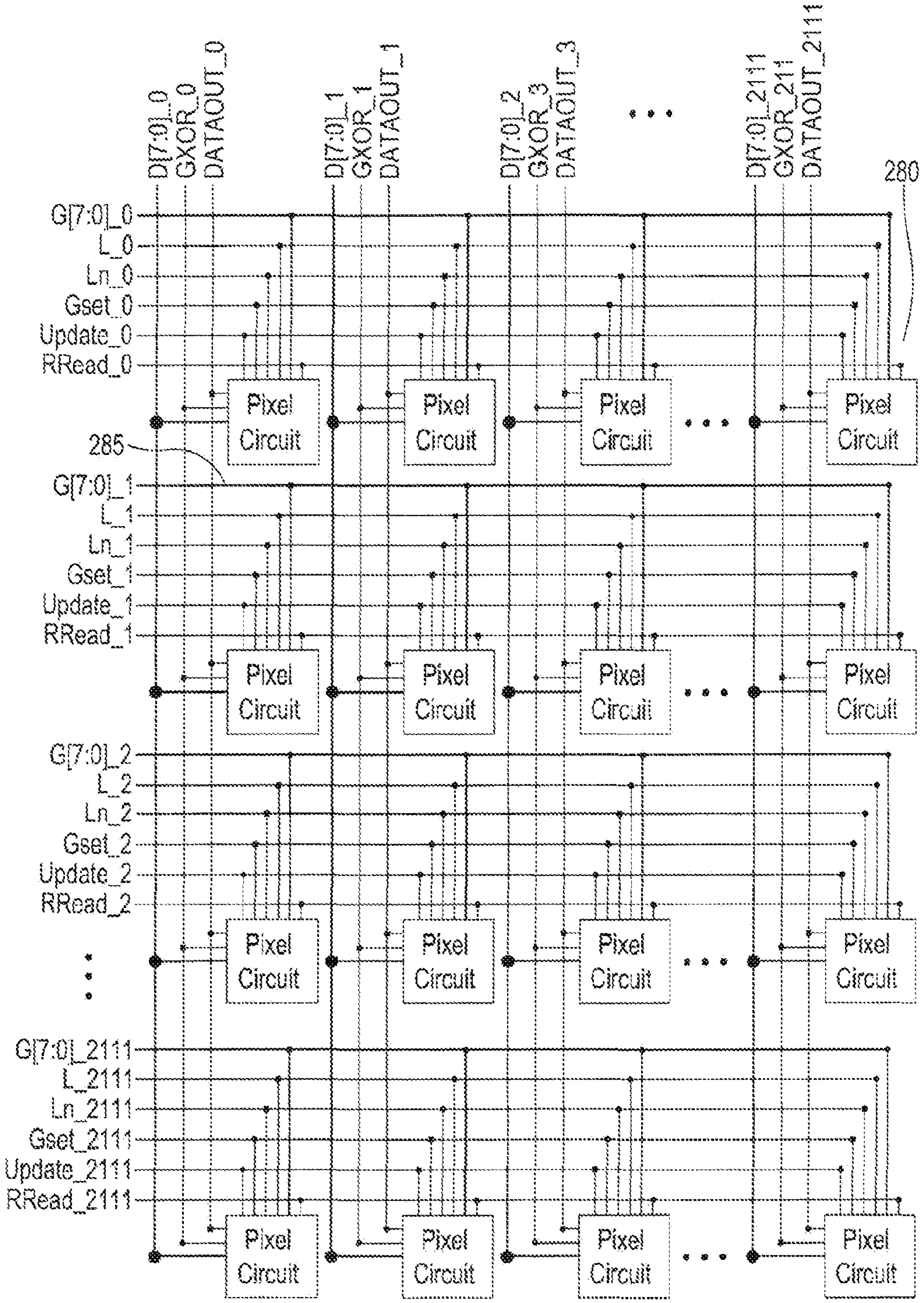
FIG. 4 is a partial array diagram according to an embodiment of the present disclosure.

FIG. 4 illustrates a simplified diagram of the "pixel array" 280 according to one embodiment of the disclosure. The array 280 is just a rectangular matrix of individual pixels. It should be understood by one of ordinary skill in the art that the shape of the pixel array may vary. In an embodiment of the disclosure, the pixels include pixel circuits 285, connected to a regular array of row and column wires. Each of the individual pixel circuits 285 has a "Pixel Electrode" or LED 630 (see FIG. 9) connected to its output in an embodiment of the present disclosure, the Pixel Electrodes 630 may be square metal plates that lie directly over the pixel circuit 285. In an embodiment of the present disclosure, the pixel electrode may be a reflective device, for example a metallic reflective mirror device. In an embodiment of the present disclosure, the electrode may be an LED or an electrode coupled to an LED. In an embodiment of the present disclosure, the electric field that controls the behavior of the Liquid Crystal forms between these Pixel Electrodes 630 and the Vcom electrode (not shown), which is a continuous transparent conductive film on the opposite side of the Liquid Crystal. The Liquid Crystal may be a Liquid Crystal on silicon array (LCoS) including a liquid crystal layered between two substrates. For purposes of describing embodiments of the present disclosure, an LCOS display is reference. However, the embodiments of the present disclosure, may incorporate or be used with other types of displays, for example an LED display, such as a microLED display. Also, any reference to a display is likewise a reference to a microdisplay.

The array 280 is set up so that individual rows of pixel circuits 285 can be written in one operation, by asserting the "L_x" and "Ln_x" row strobe pair of inputs or data inputs for that row, where the "_x" just indicates which row is being driven. Note that in FIG. 4 all the inputs or outputs (G[7:0], L, Ln, Gset, UPDATE, RRead, D[7:0], GXOR, and DATAOUT) have similar "_x" notation appended to them. This serves to indicate which row or column each voltage is associated with. In an actual implementation, some of these inputs/outputs will be buffered versions of the originating signal, in order to keep circuit loading from becoming too high. For example, in the first column the D[7:0]_0 voltage drives the inputs to 2112 pixel circuits in the first column. This is already a fairly heavy electrical load, and, in an embodiment of the present disclosure, D[7:0]_0, D[7:0]_1, D[7:0]_2, . . . are each driven from non-inverting buffers connected to a "master" D[7:0] The "_x" notation and these buffering issues will be omitted in the rest of description required for clarity purposes. In addition, FIG. 4 shows input "RRead_x" and output "DATAOUT_x". These are internal test inputs/outputs used for on-chip testing. It should be understood by one of ordinary skill in the art that the number of pixels, number of pixel circuits, and the size of each pixel may vary in embodiments of the present disclosure.

Figure 3:
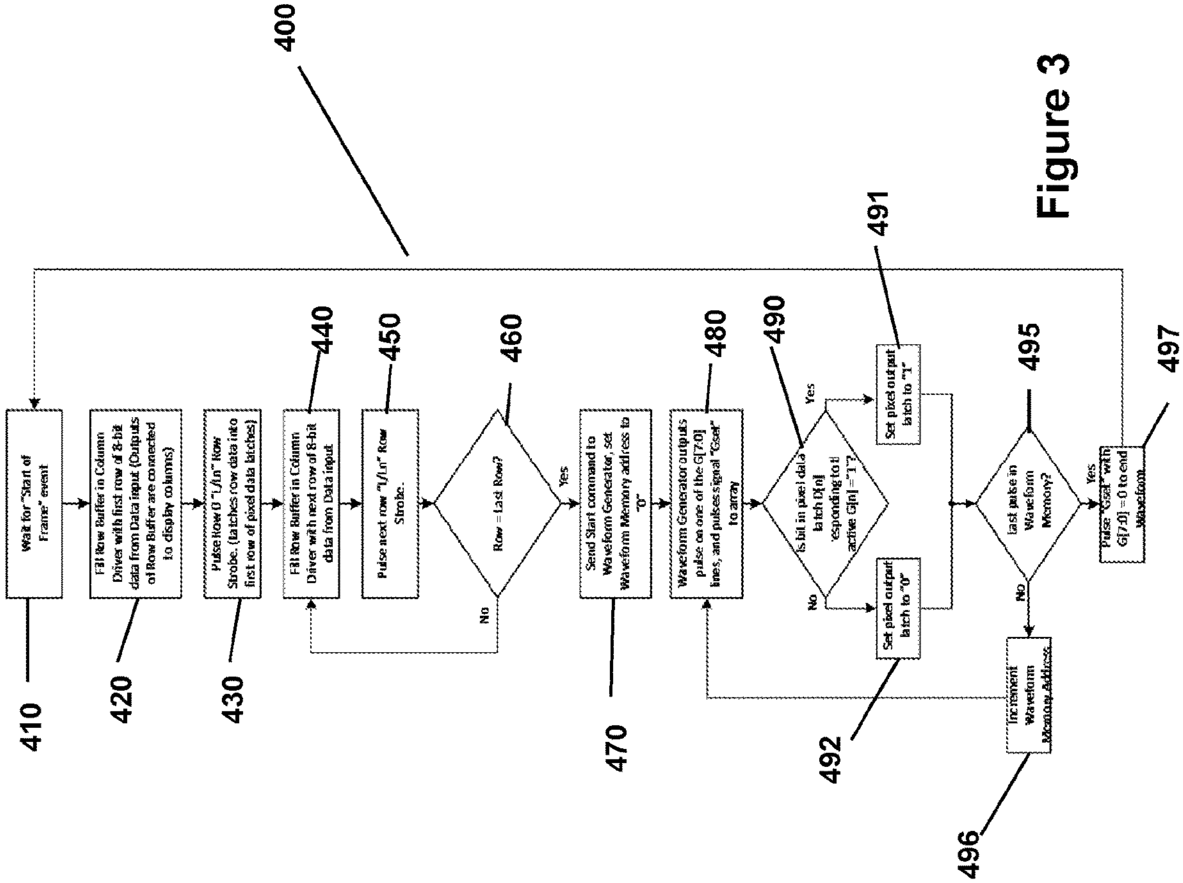
FIG. 3 is a DPM operation flow chart according to an embodiment of the present disclosure.
Figure 5:
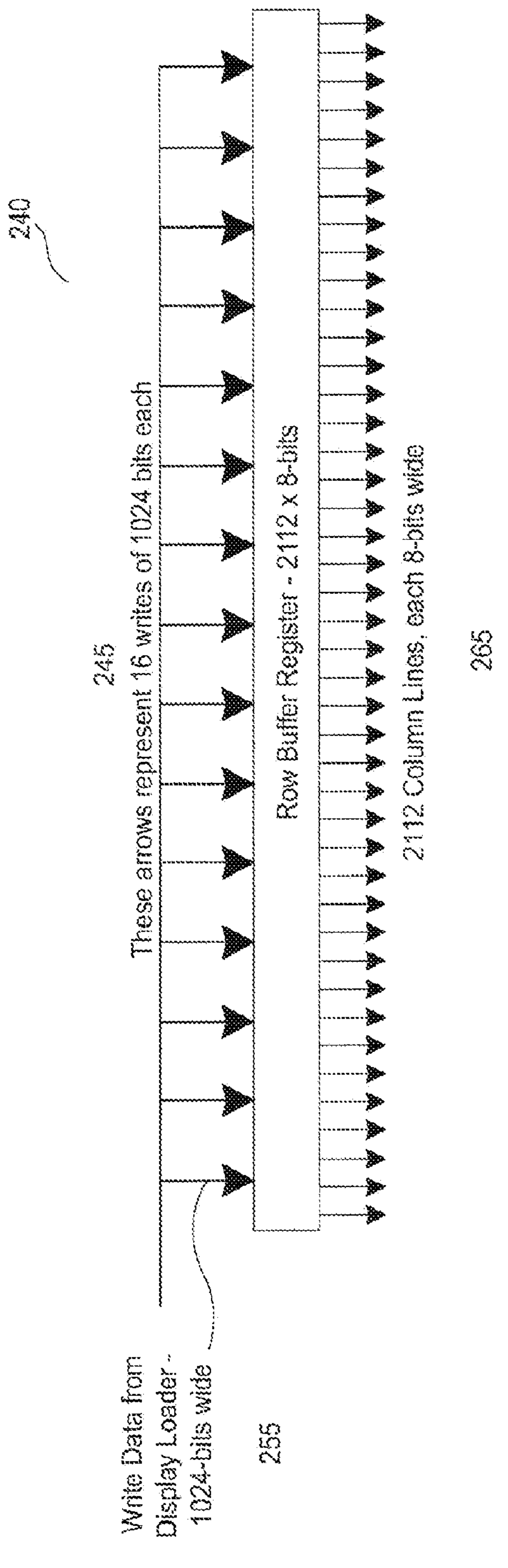
FIG. 5 is a row formatter detail according to an embodiment of the present disclosure.

Referring back to the flow chart 400 of FIG. 3, once the Start-of-Frame signal 410 has been received by the row controller or "Display Loader" 230 from the data source (via the Parser 275 and Command FIFO 270, using a timebase 276) the Display Loader 230 begins to write 420 the appropriate data into the "Row Formatter" 240 during the next 16 clocks. A simplified diagram of the Row Formatter 240 is shown in FIG. 5. The arrows 245 represent 16 writes of 1024 bits each, which has arrived from the Display Loader 230. The Row Formatter 240 handles image flip and offset, and routes the data into a row-buffer register 255 that is inside the Row Formatter 240. It also performs padding the 2048 active image columns with 64 additional "steering" data columns. It should be understood by one of ordinary skill in the art that the number of steering columns may vary. The row-buffer 255 has 2112 individual 8-bit outputs 265 that form the 8-bit "Column-Lines" of the array. These outputs 265 of the row-buffer 255 are connected to the display columns of the array 280, as showing in FIG. 4. Once the row buffer 255 is filled up, the Display Loader 230 (via the "Row Cntrl" block 250) asserts 430 the first "L/Ln" row strobe data pair for the first row. It should be understood by one of ordinary skill in the art that the number of bits may vary, data may be expressed by a voltage, and the number of bit outputs may vary.

Figure 6A:
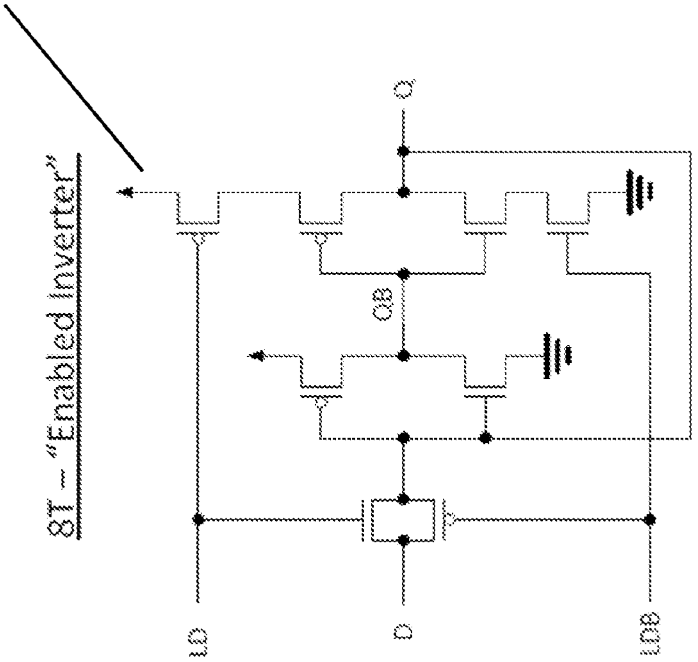
FIGS. 6*a* and 6*b* show a pixel data latch schematic (6*a*) and a layout view (6*b*) according to an embodiment of the present disclosure.
Figure 6B:
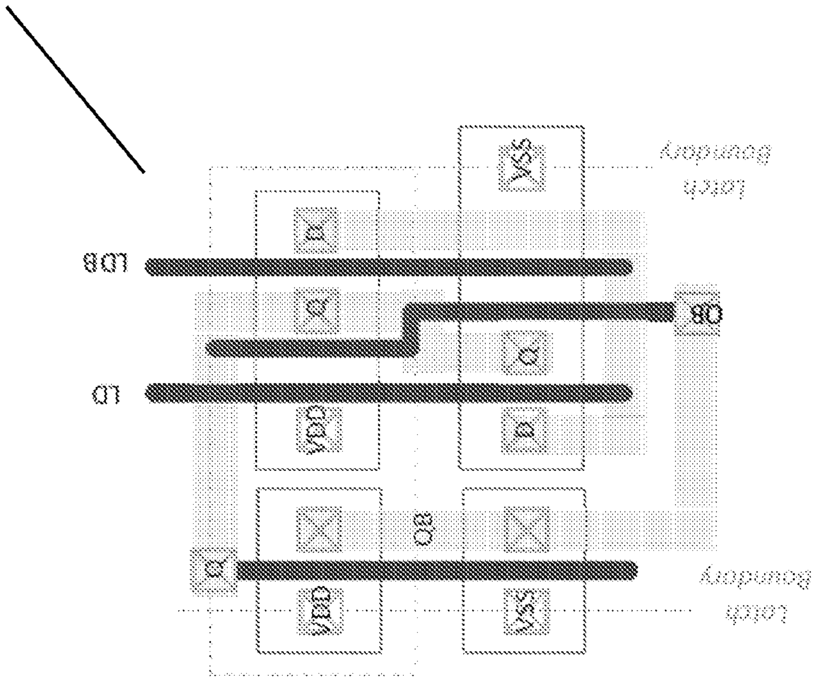
Figure 7:
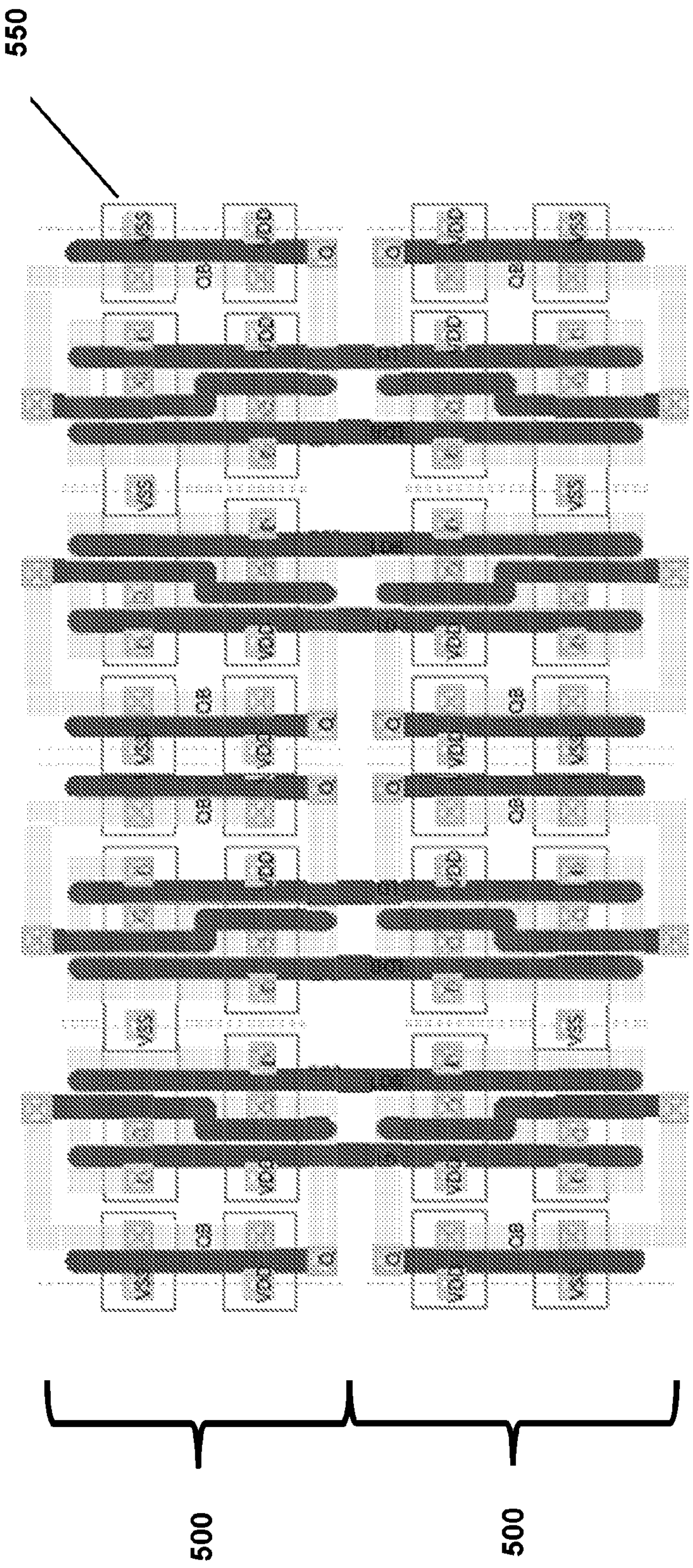
FIG. 7 is an optimized layout of 8 pixel data latches according to an embodiment of the present disclosure.

For each pixel in the row, the L/Ln voltage pair enables an 8-bit data latch 500 in the pixel to capture (or latch) the data from the associated column. In an embodiment of the present disclosure, there may be, between and including, four to ten latches. However, it should be understood by one of ordinary skill in the art that the number of latches may vary. This strobe pair of L/Ln voltage remains asserted for a few clocks (the exact number is programmable via a field in the Control Register) in order to give all the data latches in the first row of pixel circuits time to capture the data. Once these few clocks are up, the L/Ln pair is de-asserted. FIG. 6*a* shows the schematic of the Pixel Data Latch 500 (for 1-bit), and FIG. 6*b* is a simplified view of how this appears when arranged on the silicon or backplane of a display. FIG. 7 shows a 4×2 (w/h and V mirroring) array 550 of 8 of these latches 500, which is what is used in each pixel. This illustrates that the latch design can be arrayed together very compactly. The Pixel Data Latch 500 schematic is a variant of the standard "6T" SRAM. It has been modified to include "unloading" transistors which allow ordinary logic signals to easily set or clear this latch when the "L" and "Ln" latch enable is asserted. The complementary pair of inputs L & Ln are used instead of a single-ended input because it makes the pixel transistor-level design simpler. However, in an embodiment of the present disclosure, a single ended input may be utilized by adding additional inversion logic.

Subsequently, Display Loader 230 again begins to write 440 the appropriate data into the row-buffer 255 of the "Row Formatter" 240, and asserts 450 the next "L/Ln" row strobe pair for the next row. At step 460 in FIG. 3, the display device 200 checks to see if the last row has been reached. If not, steps 440 to 460 is repeated until all 2112 rows in the array 280 have been written. At this stage, all pixels in the array 280 now contains the image data. This entire process may take approximately 50-100 μs.

At this point in time, all of the data needed for the current frame (or color sub-frame if this is a Color Sequential display) has been loaded into the pixel data latches, and the actual display process can begin. From this point until the start of the next frame or sub-frame, the data interface and cache memories are not used, and all display data needed to define the image resides within the static-ram pixel data latches 500 of the pixels.

Figure 8:
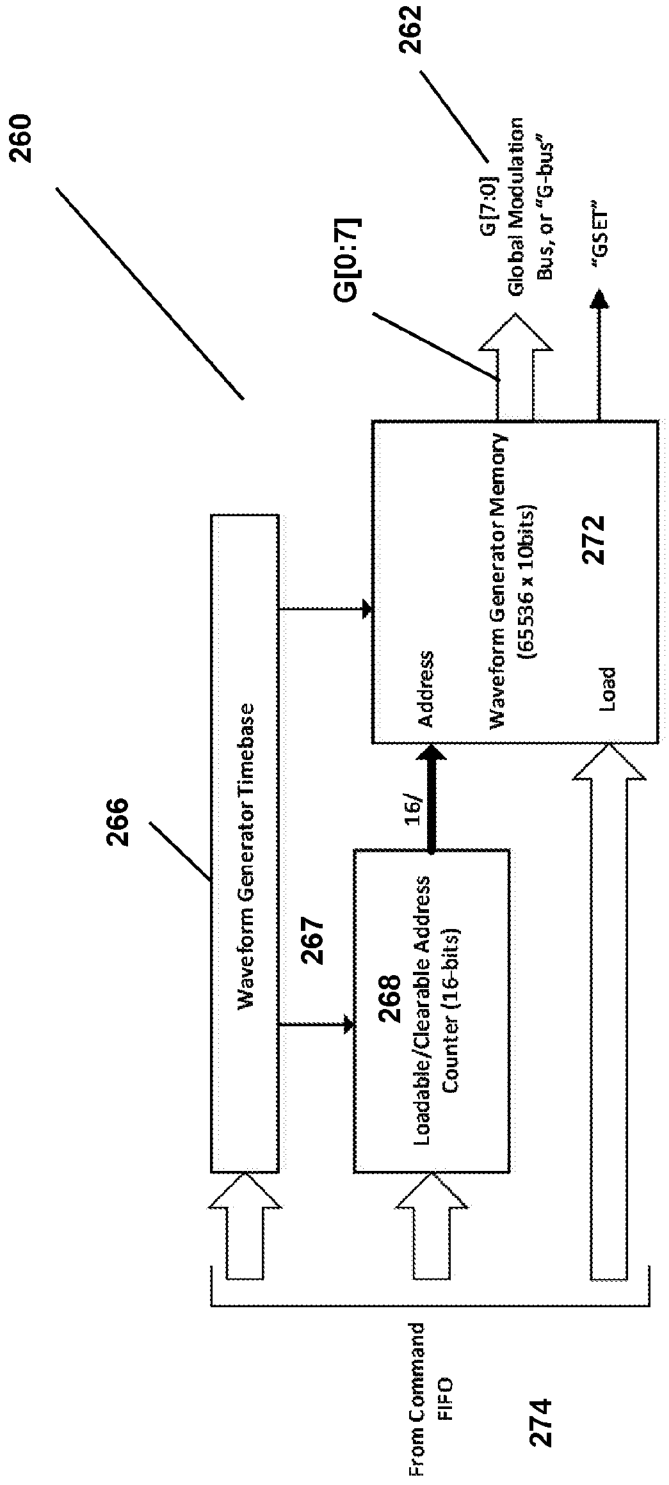
FIG. 8 is a waveform generator detail according to an embodiment of the present disclosure.

The process is now at the "Send Start command to Waveform Generator" at box 470 in FIG. 3. A simplified block diagram of the Waveform Generator 260 is shown in FIG. 8. The Waveform Generator 260 receives a command 274 from the Command FIFO 270. Additionally, the Waveform Generator 260 comprises a waveform generator timebase 266, which is a logic block that processes a clock to produce a further clock and optionally a start/stop signal and sends these digital signals 267 to drive both a loadable/clearable address counter 268, and a waveform generator memory 272. At step 260, the waveform memory address in the memory 272 is set to "0". The function of the Waveform Generator 260 is to drive a pattern of pulses (represented by G[7:0]) onto the 8-bit "G-bus" 262 that in turn connects to every pixel in the display 280, and to drive the "Gset" signal which is also routed to every pixel in the display 280. The G-bus 262 works with the logic in each pixel to convert the pixel data stored in the pixel data latches 500 into waveforms that are presented on the pixel electrodes 630 or to the pixels 281. The G-bus signals serve to sequentially gate versions of the individual bits of the pixel data latches 500 onto the pixel electrodes 630, with the amount of time each is gated onto the pixel electrodes 630 being determined by the timing of the G-bus signals. The Gset signal is a latch-enable for the pixel output latch. The actual waveform on the G-bus 262 is programmable, and indeed must be programmed at the start of operation. Determining this waveform is a complex process involving simulations of the LC behavior. However, there are some common rules that these waveforms must obey for proper DPM operation: 1) only one of the 8 G-bus signals can be true ("1") at any instant in time; 2) there must be at least 1 pulse on each line in the G-bus in each "sub-cycle" or "sub-frame"; and 3) there must be a Gset pulse coincident with the start of each pulse on any of the 8 lines of the G-bus.

Figure 9:
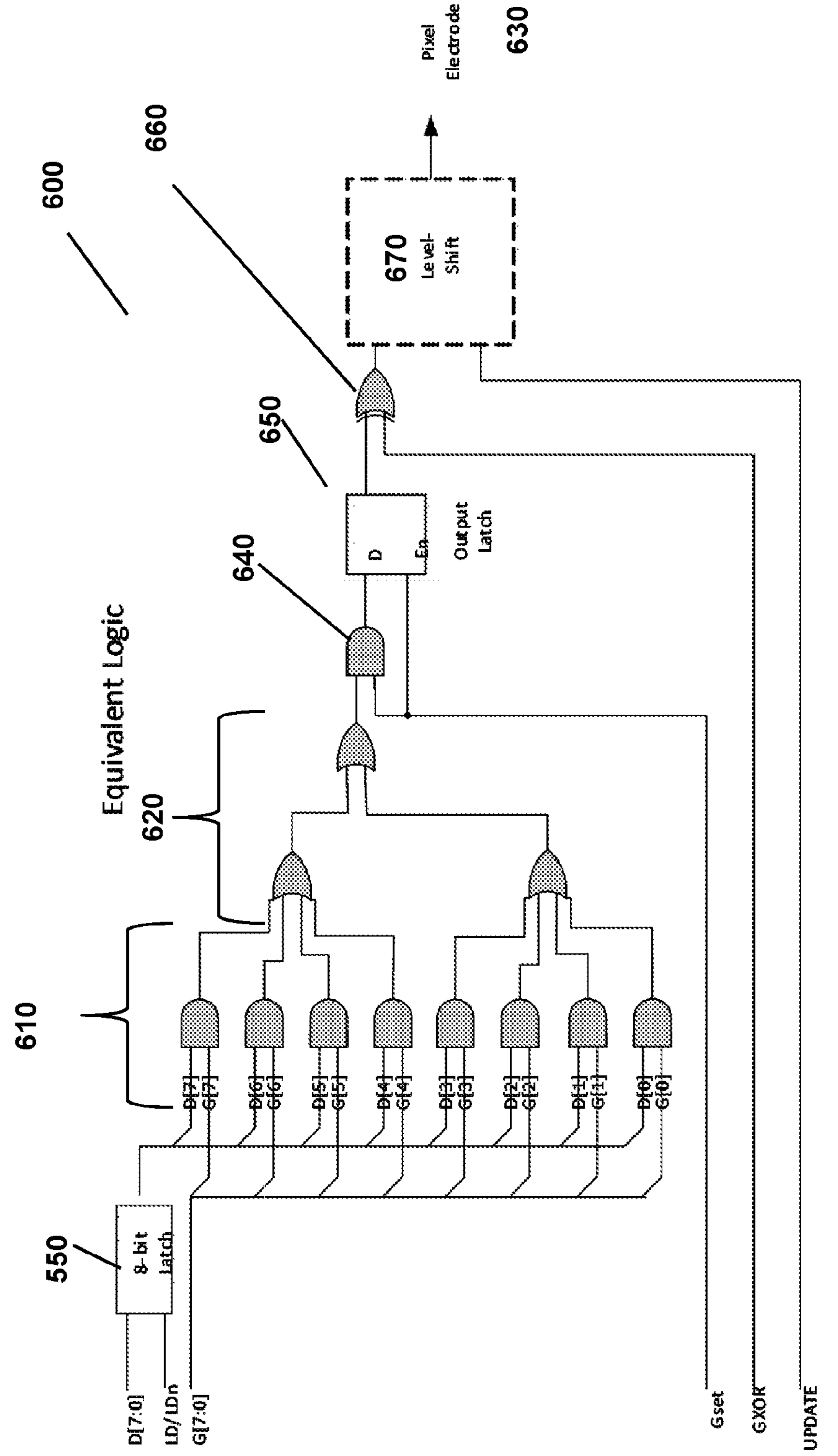
FIG. 9 is a logic diagram of a DPM pixel according to an embodiment of the present disclosure.

To understand how this works, it is helpful to look more closely at the logic in a pixel, and a minimal G-bus waveform. FIG. 9 shows a pixel block diagram 600 showing the pixel logic. The pixel logic 600 has been designed to be implemented with very few transistors. As can be seen in FIG. 9, there is a row of 8 AND-gates 610, and OR gates 620 to collect the outputs from the AND-gates 610. Normal "Standard-Cell" AND or OR gates typically takes about 8-10 transistors each, and a standard-cell D-Latch (like the pixel data latches can take 20 or more transistors). However, in embodiments of a latch in accordance with embodiments of the present disclosure only 8 transistors are used, and single FETs as AND gates are used. This can be done in some cases, and the design has been deliberately crafted to make this possible. In FIG. 9, it can be seen that the output of the OR gates 620 is fed into another AND gate 640, together with the Gset from the Waveform Generator 260. The same Gset is also fed directly into an output latch 650, along with the output of the AND gate 640. In some embodiments, the output of the latch 650 is fed into a XOR gate 660, along with a related GXOR signal. The signal GXOR and a related XOR gate are optional features, and are not required in all implementations. Their purpose is to invert the waveform going to the level-shifter 670. This is an advantage in non-Color-Sequential applications, where it is usually necessary to replay an inverted version of the image in order to achieve DC-balance and to avoid image-sticking. By including this XOR function 660, the image can be inverted without needing to reload the image. For Color-Sequential applications this capability has no value. Displays designed for such applications will usually omit this gate and the related control signals. Finally, the output of the XOR gate (or the latch 640) is directed to pixel electrodes 630

Figure 10:
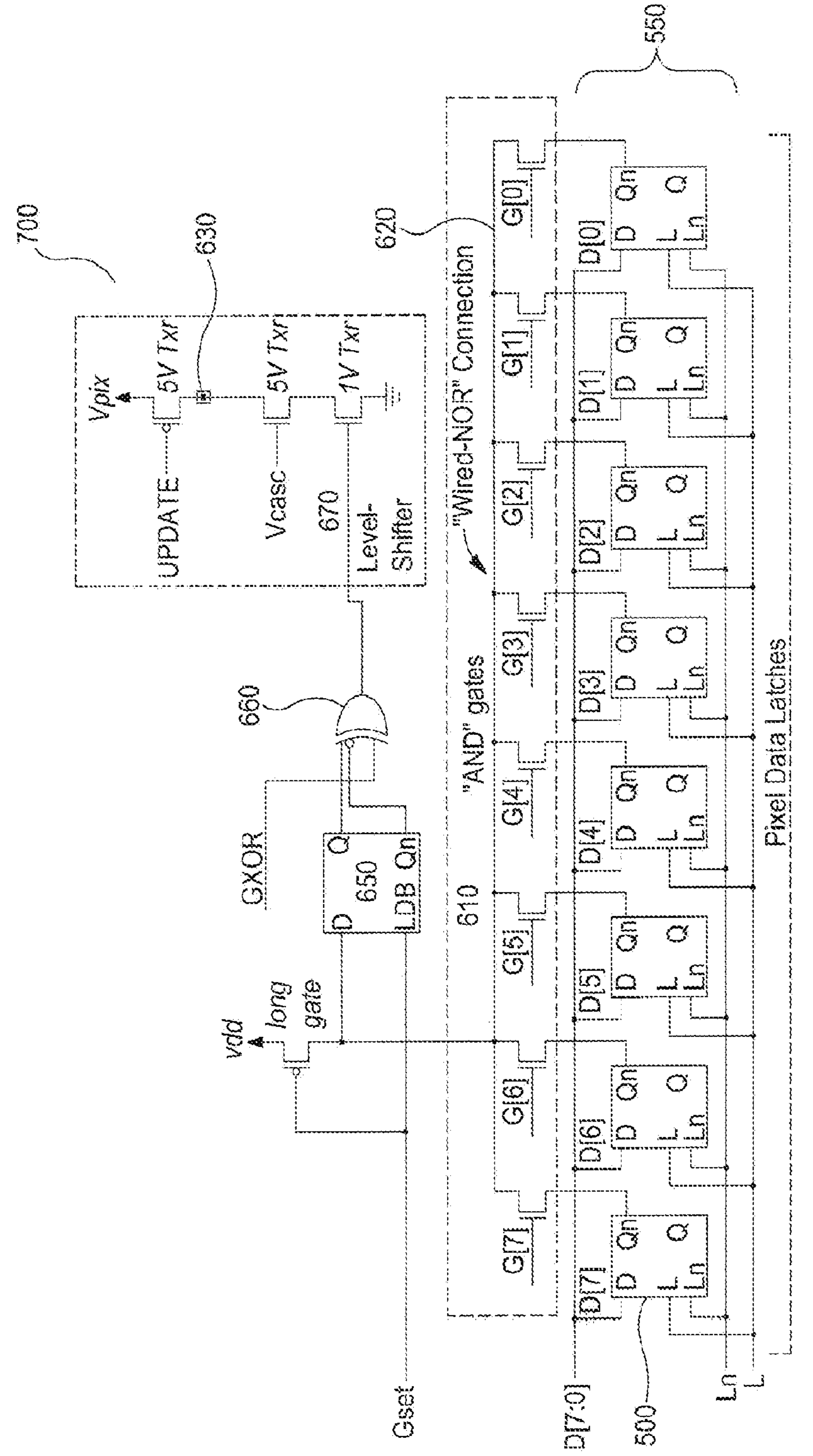
FIG. 10 is a pixel schematic according to an embodiment of the present disclosure.

FIG. 10 shows a transistor-level pixel schematic 700 of pixel logic of FIG. 9. A dashed-rectangle shows the FETs that are AND-gate 610 equivalents, and the common connection pointed out functions as a "Wired-NOR" structure in place of the OR-gates 620. Again, Wired-OR or Wired-NOR connections are a circuit feature well-known to practitioners of digital design, and the use in this case saves a lot of transistors. It is estimated that this pixel design would take in excess of 250 transistors if implemented using Standard-Cell logic, but this version takes approximately 95 transistors (not including the level-shifter, which uses larger high-voltage transistors). It has been shown that all this circuitry, including a suitable level-shifter 670, can be laid-out to fit in a small pixel area, for instance in a 3 um×3 um pixel using a 28 nm process geometry.

FIG. 10 shows one version of the Pixel Electrode Level-Shifter 670, but other Level-Shift designs could be used with embodiments of this present disclosure without changing its validity. Additionally, there are other modifications that could be made to the design that do not invalidate it. For example, PFET transistors could be used instead of NFET ones, the Q and Qn outputs of the data latches 500 could be exchanged, signals could be replaced by their inverted versions, a non-differential version of the row strobe (L/Ln) could be utilized, etc. As mentioned before, the signal GXOR and a related XOR gate 660 are optional features of embodiments of the present disclosure.

Figure 11:
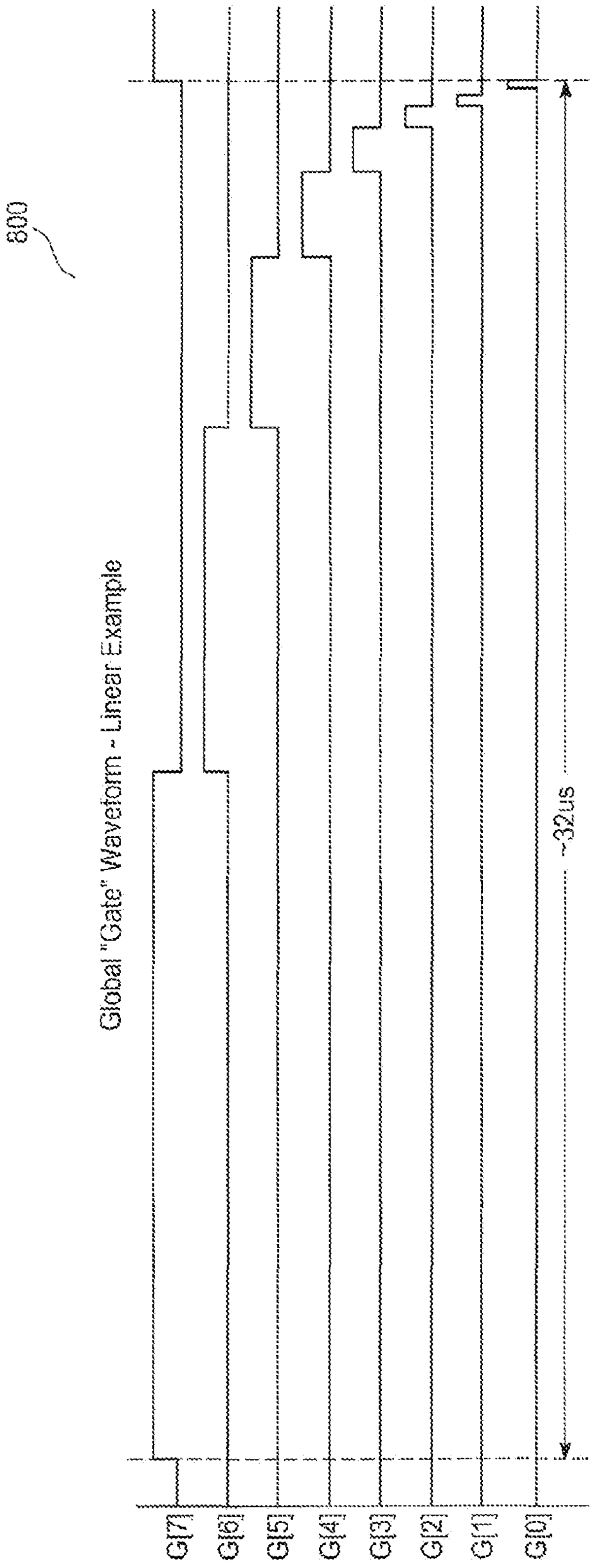
FIG. 11 a simple G-bus Waveform example according to an embodiment of the present disclosure.

FIG. 11 illustrates a simple G-bus waveform 800. As can be seen, the G-bus signals are binary-weighted pulses, with the MSB on G[7] and the LSB on G[0]. Looking at the start of the waveform 800, imagine that the data pattern in this pixel is decimal 170, which in binary is "10101010" (this was stored on the "8-bit latch" 550 in the pixels during the data load operation). FIG. 11 illustrates that G[7] is true for the first half of the 32 μs sub-frame (this is step 480 in FIG. 3, where the waveform generator 260 outputs a pulse for G[7]). At step 490, a comparison between G[7] and D[7] is done to see if their corresponding bits match. FIG. 9 illustrates that if G[7] is "1", and if D[7] is also "1" (as is true for decimal 170), this will result in a "1" at the output of the uppermost AND gate. This 1 will be passed through the OR gates 620 and will end up at the input of the output latch 650 (step 491), but only when the Gset signal is also set to true. This will set the output latch 650, whose output passes through the level-shifter 670 and ends up on the pixel electrode 630. The result is that the pixel electrode 630 will be high for the first half of the frame.

At the end of the G[7] pulse, FIG. 11 illustrates that a new pulse begins on G[6]. However, the bit from the data latch 550 for D[6] is a "0". Since G[6] and D[6] are AND' d together, the output of this AND gate will be 0 and this 0 will end up at the input of the output latch 650 (step 492 in FIG. 3). If a Gset pulse is present at the beginning of the G[6] pulse, this will result in the output latch 650 being cleared to the low state and based on the G-bus timing this will mean that the pixel electrode 630 voltage will be low for the next ¼ of the frame. At the end of the G[6] pulse, there is a new pulse on G[5], and since D[5] is also "1" the G[5] pulse will end up causing the output latch to be set again, and pixel electrode 630 will again be high—this time for the next ⅛ of the sub-cycle. This repeats sequentially for G[4], G[3], G[2], G[1], and G[0].

Thus, after each pulse the display device 200 checks to see if the previous pulse was the last pulse stored in the waveform memory 272 (step 495 in FIG. 3). If not, the waveform memory address in memory 272 is incremented by one (step 496), and steps 480 to 495 are repeated. Otherwise, the Gset signal is pulses with "0" to end the waveform at step 497. At this time, voltage waveform is generated on the pixel electrode 630 based on the data value of "10101010", pulses that are alternating high—low—high—low—high—low—high—low, with the total sequence taking 32 μs in this example.

Figure 12:
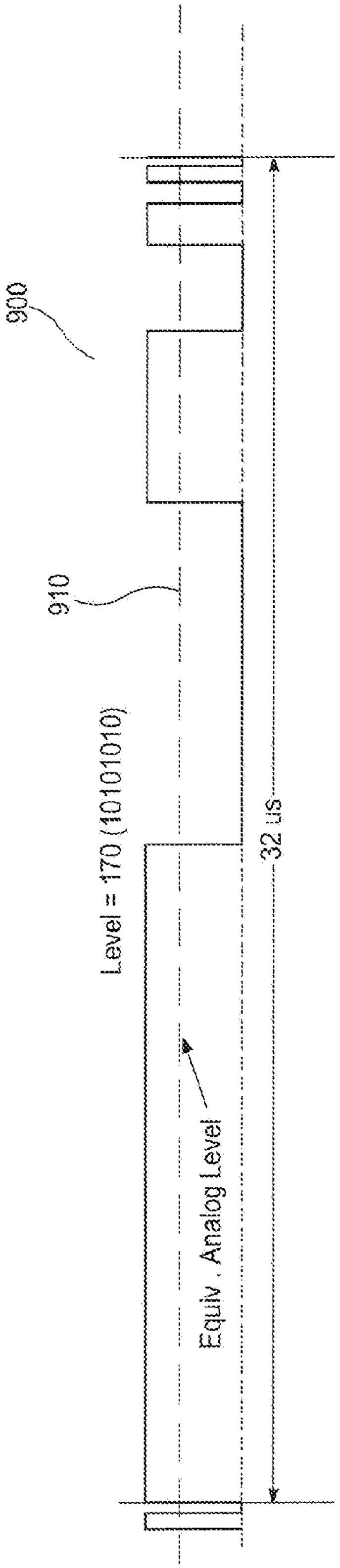
FIG. 12 is a Pixel electrode waveform for the data pattern "10101010" using the G-bus Waveform of FIG. 11.

FIG. 12 shows this resulting voltage waveform 900 of the above process. Exact values for "high" and "low" depend on the level-shifter 670 and external Vpix supplies (these are not shown).

FIG. 11 and FIG. 12 illustrate a 32 μs period during which each bit of the data on the data latch 550 is used. This is what is referred to herein as a "sub-cycle" or "color sub-frame", and 32 μs is a realistic minimum sub-frame duration. In some applications, image frames or color sub-frames last much longer than 32 μs, so this process may be repeated for as many times as are required to fill-up the frame or sub-frame. Indications of this can be seen in FIG. 12, where the end of the previous sub-frame and the beginning of the following sub-frame can be seen. The total time resulting from the number of segments in the sub-frame multiplied by the number of repetitions of the sub-frame, must be equal or less than the length of the waveform memory. Note also that the waveform generator 260 has a programmable time-base. If desired, different time-base values can be used to make the sub-frame be proportionally longer or shorter, as needed. Finally, it can be noted advantageously that 1) nothing in this system requires only 1 pulse per G-bus line, and 2) nothing requires the G-bus pulses to be in any particular order. For example, the MSB could be divided into say 4 pieces each of ¼ the normal duration, and these pieces could be scattered among the other pulses. This flexibility is an important advantage of embodiments of the present disclosure and allows the exact behavior of the DPM modulation to be almost infinitely tweaked. It is envisioned that multiple different Waveform Generator patterns according to the embodiments herein may be designed depending on the needs of specific customers and/or display applications. These may be included in system software according to embodiments of the present disclosure and can be loaded during a system boot-up process.

The action of the circuitry of the embodiments of this disclosure result in a binary-weighted waveform at the pixel electrode 630 or pixel 281 that repeats a fixed number of times during the frame. How this affects the LC state depends on the waveform timing. The Liquid-Crystals commonly in use in microdisplays like this have rise and fall times in the range of 400 μs to 2 ms. For voltage pulses at the pixel electrode equal to or longer than say ~100 μs, the LC can at least begin to respond to the voltage pulse by at least beginning to change state during the pulse. For example, for a drive waveform consisting of intermediate-length pulses like these, it becomes quite difficult to predict the response. The LC sees the pulses as long-enough to approach a steady-state conditions and tries to fully respond to them, becoming fully-on or fully-off. Generally, the pulses are not long enough to quite allow a full response before the next pulse begins. The result is that the LC exhibits a "history effect", where its response to any given pulse sequence depends on the history of recent previous pulses. This is nearly impossible to correct for, and as a result displays of this sort have to use PWM techniques—these are more resistant to errors due to history effects.

When observing the output with a fast-responding light sensor, the LC transmission would rapidly vary between mostly "on" and mostly "off" while displaying a mid-gray, for example. ("Rapidly" in this context is with rise/fall times in the 400 μs to 2 ms range, as noted previously). The eye can average these out and give an acceptable appearance of continuous-tone gray-scale, although getting a smoothly varying gray-ramp can be difficult because of the non-linear consequences of the History-effect. However, when trying to operate in Phase-mode this does not work at all because phase errors actually affect the details of image feature positions, and the eye cannot average this out.

However, the situation changes dramatically if the pulse-lengths become much shorter, and this is why DPM has a big advantage. Embodiments of the present disclosure are not restricted to bit-plane timing, and so the individual pulses in a DPM sub-frame can be as short as desired. In an embodiment, the DPM has the complete sub-frame as short as 32 μs, with individual pulses as short as 125 ns. The LC cannot respond in any substantial way to the individual pulses in such a sequence. Instead, the LC or pixel 281 will respond to the RMS equivalent of the voltage on the pixel electrode 630. This is both a quantitative and qualitative difference. In conventional digital displays, the eye averages the optical appearance of a series of LED or LC-generated light pulses into an equivalent gray-scale. In contrast, in a DPM digital display according to embodiments of the present disclosure, the Liquid-Crystal averages a series of voltage pulses into an equivalent gray-scale. LC displays respond to an emulated series of DPM-style voltage pulses in exactly the same way that they respond to the RMS-equivalent DC voltage.

The advantages for an Amplitude-mode display are mainly that true 8-bit operation without needing to resort to dithering is readily possible (because one can generate shorter pulses than would be possible in a bit-plane display). The advantages for a Phase-mode display are more dramatic. The phase smoothness (or amount of phase-ripple) for a prior-art digital display depends on the length of a bit-plane, as noted typically 50 μs to 100 μs. This bit-plane timing causes significant alternating overshoot and undershoot in a prior-art phase-mode display (generally 2-5%) which are very objectionable, and interferes with getting a clear phase-mode image. Because DPM phase-mode displays according to embodiments of the present disclosure, do not have this minimum bit-plane duration requirement, they can readily generate phase-shifts with peak ripple numbers at least an order of magnitude (10×) smaller than comparable non-DPM displays.

FIG. 12 includes a dashed line 910. This is an indication of what this pulse sequence would look like to the Liquid Crystal. This is the case because the longest pulse in this sequence is 16 μs, which is about $1/30^{th}$ of the normal LC rise or fall time. Because these pulses are so much shorter than the LC can respond to, the LC responds to the RMS equivalent voltage of the entire sequence—suggested by the dashed line 910.

Figure 13:
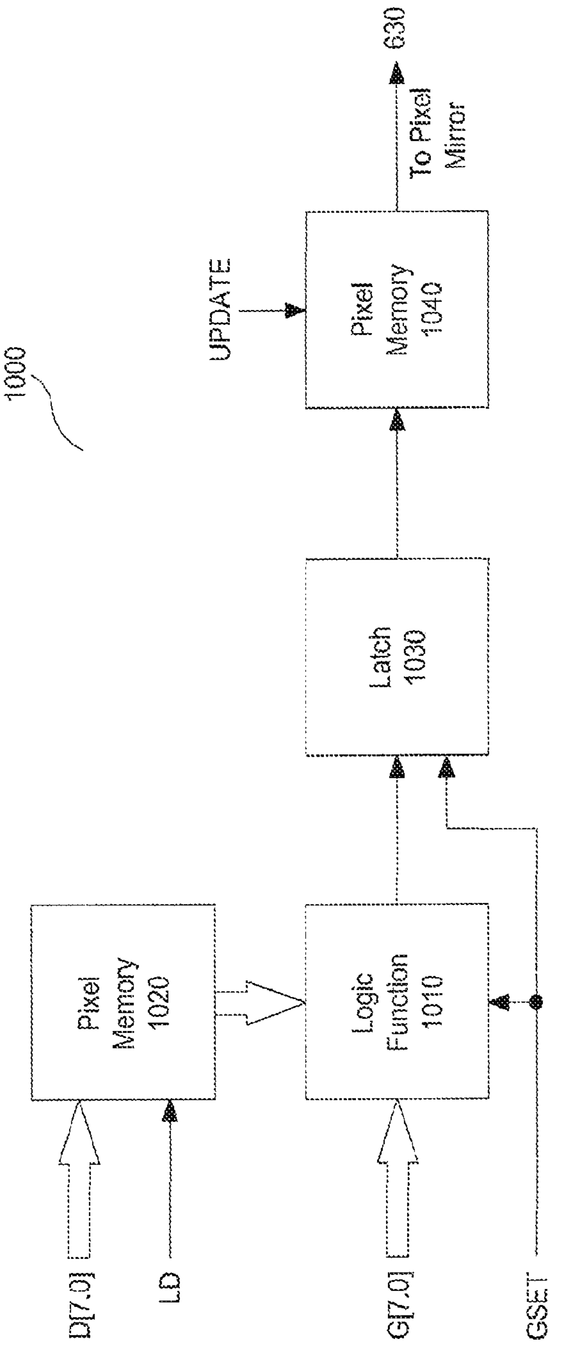
FIG. 13 is a pixel logical diagram for another embodiment of the disclosure.

In another embodiment 1000 of the pixel, illustrated in FIG. 13, the AND/OR tree is replaced by a more complex logic function 1010, such as XOR/OR, forming a comparison function between the value stored in the Pixel Memory 1020 and the value on the G bus 262. As before, a GSET signal is provided which pulses at each change of the G bus value to update the final latch 1030 that is coupled to the final pixel driver or Level Shifter 1040. In an embodiment, the G bus 262 may contain a multi-bit binary counting pattern, increasing or decreasing in value at certain programmed points in time, and the logic function 1010 will cause the logic result Y to be true only when the G bus value matches the value stored in the pixel memory 1020. Combined with an initial SET or RESET, this combination results in a pulse-width-modulation (PWM) function where the width of the resulting pulse on the pixel electrode 630 is controlled by both the pixel memory contents and the timing and sequence of values on the G bus 262.

Figure 14:
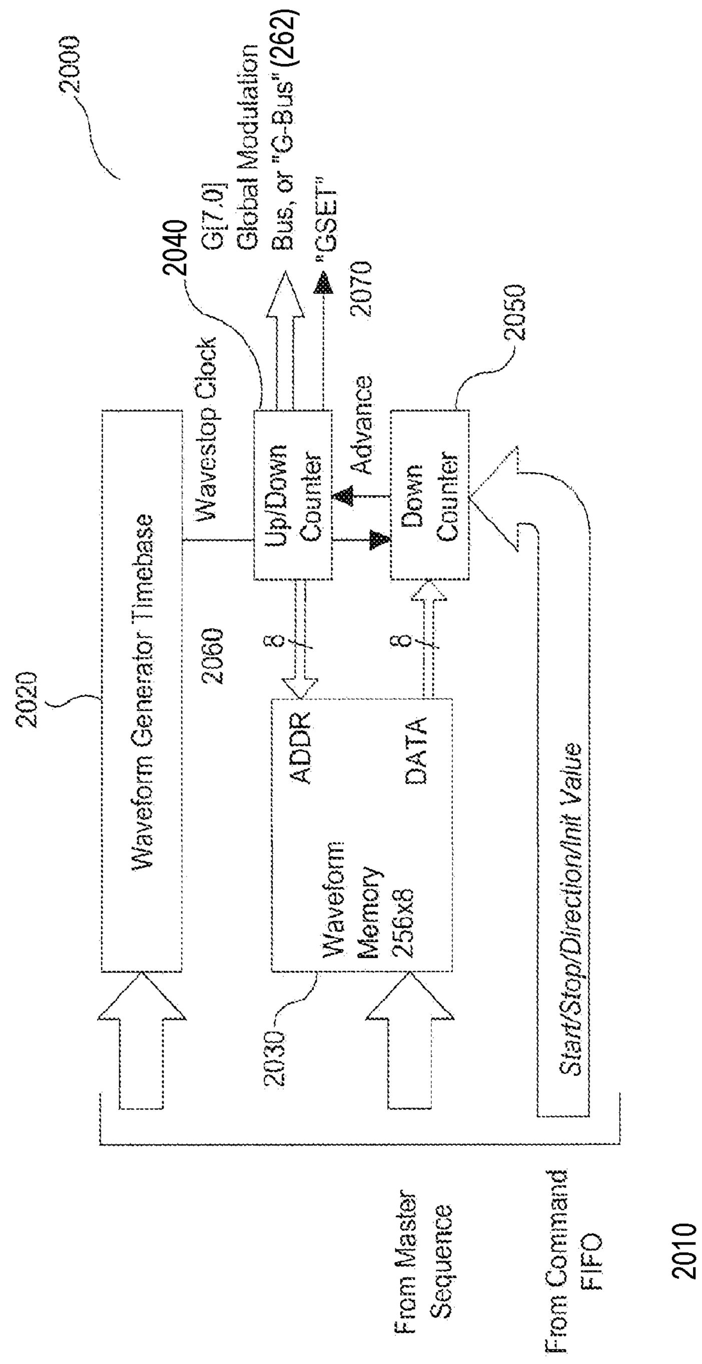
FIG. 14 is a waveform generator block diagram for another embodiment of the disclosure.
Figure 15:
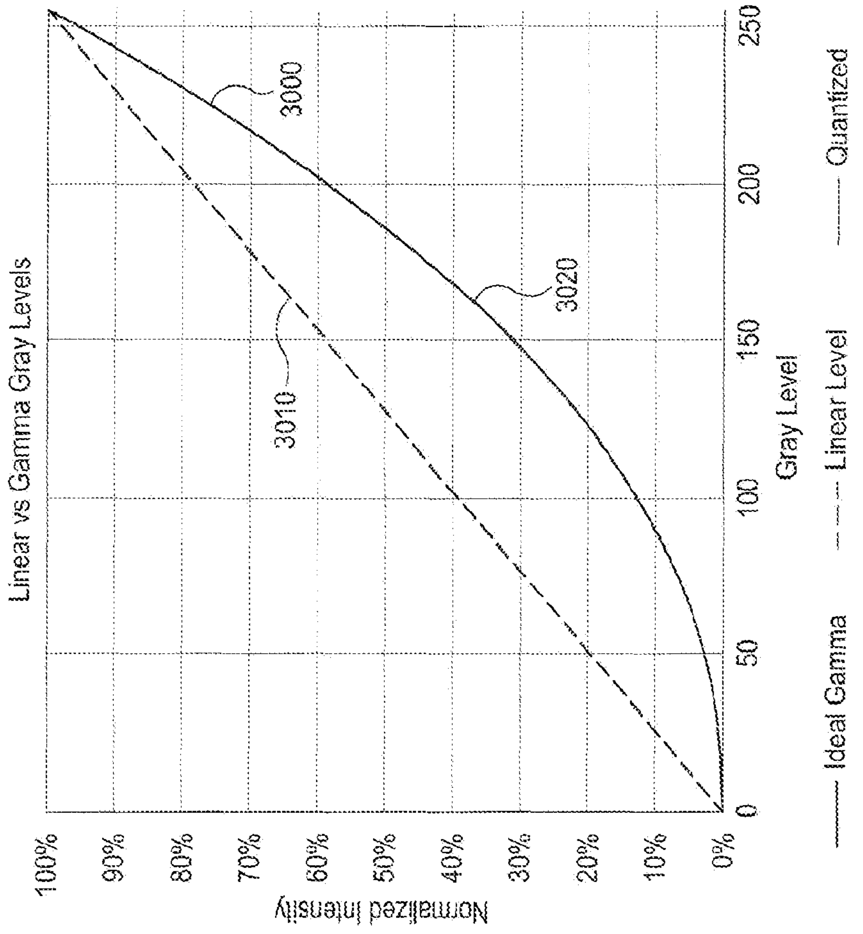
FIG. 15 is an example Gamma curve implemented by embodiments of the disclosure.
Figure 17:
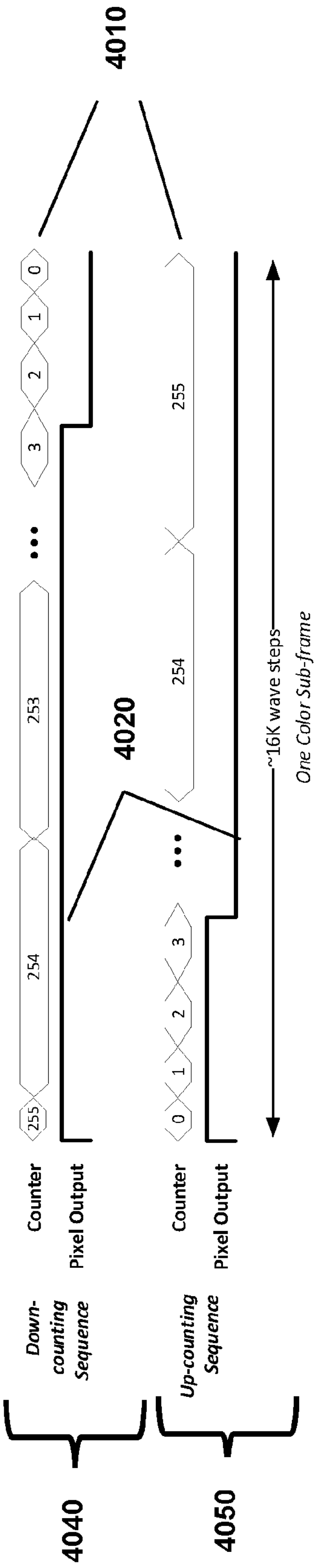
FIG. 17 is a G-bus waveform diagram for another embodiment of the disclosure.

In an embodiment 2000, the waveform generator of FIG. 8 is replaced by that of FIG. 14 to produce an increasing or decreasing multi-bit value on the G bus 262. As before, waveform generator 2000 receives a command 2010 from the Command FIFO 270, and comprises a waveform generator timebase 2020 and a waveform delta memory 2030. Once the direction is selected, and an initial value (generally 0 or the maximum count, such as 255 for an 8-bit value) is loaded into an Up/Down counter 2040, which drives the G bus 262. The output of the up-down counter 2040 is also used as the address to fetch a data value from a waveform delta memory 2030, and this value is loaded into a down counter 2050. The waveform generator timebase 2020 provides a wave-step clock signal 2060 (a periodic clock waveform) which advances both counters 2040, 2050. When the down counter 2050 reaches 0, the Advance signal 2070 is issued to the Up/Down counter 2040, allowing it to decrement or increment. The incrementing and decrementing of the up/down counter 2040 after programmable numbers of cycles stored in the waveform delta memory 2030 enables the display to have a programmable response. One color sub-frame may comprise many increments/decrements as shown in FIG. 17 discussed below. FIG. 15 compares an ideal Gamma curve 3000, with a linear level 3010. Here, the 8-bit Gray Level is expanded into a 16-bit linear light level, according to an exponent Gamma (Gamma=2.2 in this example). For instance, a Gray Level of 50 may correspond to 3% normalized intensity, corresponding to a pulse width of 487 wave-step clock periods, and a gray level of 200 may correspond to a normalized intensity level of 58%, corresponding to a pulse width of 9421 wave-step clock periods.

FIG. 16 illustrates example contents of the waveform delta memory 2030. In this example, the desire is to have the Gray Level value, corresponding to the value stored in each Pixel Memory map to a pulse whose width is equal to the number of wave-step clock periods, or clock periods of the wave-step clock signal. With the prescribed structure of the waveform generator 2000 from FIG. 14, one only needs to store the difference between desired duration values in the waveform delta memory 2030 as shown in the Waveform Delta column.

FIG. 17 illustrates the sequence of values on the G bus 262 generated by the waveform generator of FIG. 14 2000, illustrating a counter 4010, and the corresponding pixel output 4020 for approximately 16,000 steps representing one color sub-frame 4030. The top part 4040 presents a down-counting sequence and the bottom part presents an up-counting sequence 4050. Larger values, such as 255, may be programmed to persist on the bus 262 for longer periods of time, while lower values may be programmed to persist for shorter periods of time. Displays according to the principles and embodiments described herein have unique characteristics not available using any other technology, particularly in the area of phase modulation. Embodiments herein include a small-pixel phase microdisplay capable of near-zero phase ripple, high efficiency, high contrast, and 8-bits of phase modulation depth. Because no external driver chip is needed, and because small pixels (3 um-4 um) are possible, the overall display size is smaller than existing display plus driver solutions. The combination of high-bit-depth, high optical efficiency and contrast, and small physical size make it a natural fit for the emerging application areas of Augmented Reality, other Head-Mounted display applications, and compact Heads-Up vehicle displays using Amplitude mode.

The phase-modulation capability of the embodiments herein are also a significant advantage. The combination of high-bit-depth (8 bits), high speed, very-low phase ripple, and small pixels are suitable for devices such as holographic display applications, which have wide diffraction angles and require small pixels. Thus, the embodiments herein which provide sizes of approximately 3 μm are ideal when optical efficiency and wide diffraction angles are required.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A system for generating and supplying a voltage to a pixel array, said system comprising:

- a plurality of display pixels forming the pixel array, each display pixel comprising a pixel circuit for driving the pixel and the pixel circuit including a plurality of data latches and an output latch, the pixel array being a liquid crystal on silicon array, said liquid crystal on silicon array comprising a liquid crystal layered between two substrates;
- a row formatter configured to store a plurality of bits representing image data for a row of display pixels of the pixel array;
- a row controller configured to write a subset of the plurality of bits representing image data for a display pixel of the row into the plurality of data latches of said pixel circuit; and
- a waveform generator for generating reference pulses represented by a set of reference bits and wherein a number of the set of reference bits is equal to or corresponds to a number of bits stored in the data latches of each pixel circuit, the waveform generator being connected to each pixel via a Global Modulation Bus (G-bus) having a width equal to the number of bits stored in the latches of each pixel circuit, the waveform generator being configured to send out a word of memory contents on the G-bus periodically in sequence to generate a plurality of voltage pulses equal to the width of the G-bus on different G-bus lines of the G-bus, and wherein:
  - a voltage pulse on a G-bus line of the G-bus may be divided across several G-bus lines:
  - a duration of each voltage pulse on each line of the G-bus is programmable; and
  - the duration of the voltage pulses is substantially shorter than a Liquid Crystal response time;
- wherein the pixel circuit is configured to:
  - compare each reference bit to corresponding bits stored in the data latches of each pixel circuit, and generate a voltage at an electrode of each pixel based on this comparison, all the bits stored in the data latches of the pixel circuit being compared to their corresponding bits stored in the waveform generator within a time period shorter than the Liquid Crystal response time;
  - input a bit “1” to the output latch if the corresponding bit stored in the data latch is equal to “1”; and
  - input a bit “0” to the output latch when a Gset signal output from the waveform generator is applied to the output latch.

2. The system of claim 1, wherein the voltage supplied to the pixel electrodes modulates at least one of polarization, reflectivity, amplitude and phase of light reflected from the display pixels.

3. The system of claim 1, wherein the number of bits stored in the data latches of each pixel circuit is 4 to 10 bits.

4. The system of claim 1, wherein an onset of the Gset signal is coincident with a start of each voltage pulse on each of the G-bus lines.

5. The system of claim 4, wherein an output of the output latch is input to a level shifter.

6. The system of claim 5, wherein the pixel array is an LCOS array, and wherein an output of the level shifter is a voltage with a higher voltage when an output of the output latch of the pixel circuit is a bit “1”, and a lower voltage if the output of the output latch of the pixel circuit is a bit “0”, wherein the voltage on the output of the level shifter is applied to the electrode of each pixel in the LCOS array.

7. The system of claim 6, wherein there is no temporal overlap between the voltage pulses on different G-bus lines.

8. The system of claim 1, further comprising a display loader configured to write a value for the plurality of bits representing image data for a row of display pixels into the row formatter and/or configured to write a value for the subset of the plurality of bits representing image data for a pixel of the row into the plurality of data latches of each pixel circuit.

9. The system of claim 1, wherein the plurality of bits representing image data for a row of display pixels is loaded from a storage system.

10. The system of claim 9, wherein a logic function is used to compare all the bits stored in the data latches of each pixel circuit to their corresponding reference bits within a time period shorter than a Liquid Crystal response time.

11. The system of claim 10, wherein a duration of each voltage pulse is equal to a number of wave-step clock periods corresponding to a wave-step value stored in a waveform delta memory.

12. The system of claim 11, wherein each wave-step value stored in the waveform delta memory represents a different desired gray-scale value.

13. The system of claim 2, wherein the voltage supplied to the pixel electrodes modulates the polarization of the light reflected from the display pixels.

14. The system of claim 2, wherein the voltage supplied to the pixel electrodes modulates the reflectivity of the light reflected from the display pixels.

15. The system of claim 2, wherein the voltage supplied to the pixel electrodes modulates the amplitude of the light reflected from the display pixels.

16. The system of claim 2, wherein the voltage supplied to the pixel electrodes modulates the phase of the light reflected from the display pixels.

17. The system of claim 8, wherein the display loader is configured to write a value for the plurality of bits representing image data for a row of display pixels into the row formatter.

18. The system of claim 8, wherein the display loader is configured to write a value for the subset of the plurality of bits representing image data for a pixel of the row into the plurality of data latches of each pixel circuit.

19. The system of claim 1, wherein there is no temporal overlap between the voltage pulses on different G-bus lines.

20. The system of claim 1, wherein a duration of each voltage pulse is equal to a number of wave-step clock periods corresponding to a wave-step value stored in a waveform delta memory.

* * * * *